(12) United States Patent
Curran et al.

(10) Patent No.: US 6,325,471 B1
(45) Date of Patent: Dec. 4, 2001

(54) BRAKE-BY-WIRE SYSTEM HAVING CONDITIONED BRAKE BOOST TERMINATION AT KEY OFF

(75) Inventors: Patrick Joseph Curran, Northville; Dale Scott Crombez, Livonia; Steven Lee Napier, Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/522,442

(22) Filed: Mar. 9, 2000

(51) Int. Cl.$^7$ ..................................................... B60T 8/60
(52) U.S. Cl. ......................................... 303/155; 303/113.4
(58) Field of Search .................................. 303/3, 20, 89, 303/124, 152, 155, 157, 158, 113.4; 188/156, 157, 158; 701/22, 70

(56) References Cited

U.S. PATENT DOCUMENTS

| | | | |
|---|---|---|---|
| 4,974,711 | * 12/1990 | Peterson, Jr. et al. ................. | 701/70 |
| 5,139,121 | 8/1992 | Kumura et al. ..................... | 192/1.43 |
| 5,752,748 | 5/1998 | Schramm et al. ..................... | 303/20 |
| 5,769,509 | 6/1998 | Feigel et al. ......................... | 303/152 |
| 5,800,025 | 9/1998 | McGrath et al. ........................ | 303/7 |
| 5,834,854 | 11/1998 | Williams .............................. | 307/10.6 |
| 5,923,096 | 7/1999 | Manak ................................ | 307/10.1 |
| 6,139,117 | * 10/2000 | Shirai et al. ........................... | 303/20 |
| 6,193,330 | * 2/2001 | Soga et al. ............................ | 303/155 |

* cited by examiner

Primary Examiner—Robert J. Oberleitner
Assistant Examiner—Thomas J. Williams
(74) Attorney, Agent, or Firm—Gregory P. Brown; William J. Coughlin

(57) ABSTRACT

An electric powered brake system (10) for braking road-engaging wheels of a motor vehicle. An ignition switch for turning a motor of the vehicle on and off also controls the application of electric power to the electric powered brake system. A control and method (FIGS. 2 and 3) for maintaining application of full electric power to the electric powered brake system when the ignition switch is operated from ON to OFF so long as at least one parameter (60, 62, 64, 66) related to a respective component of the vehicle and indicative of a need to maintain full electric power application to the brake system continues to exist and for discontinuing application of full electric power to the brake system when all of selected ones of several such parameters are indicative of lack of need to maintain full electric power application to the brake system.

14 Claims, 3 Drawing Sheets

BRAKE-BY-WIRE SYSTEM HAVING CONDITIONED BRAKE BOOST TERMINATION AT KEY OFF

BACKGROUND OF THE INVENTION

1. Field of the Invention

This invention relates generally to brake systems for wheeled motor vehicles, and more specifically it relates to a brake-by-wire system.

2. Background Information

A brake-by-wire system may comprise a pedal that depresses a master cylinder plunger to perform the service brake function for a motor vehicle. The service brake function is performed by selectively applying electrically boosted hydraulic brakes or regenerative brakes. Hydraulic brakes generally apply friction forces to the wheels to dissipate energy as heat. Regenerative brakes may take any of various forms, but are often considered to comprise a rotary electric machine load that is applied to one or more driven wheels. When a regenerative brake is applied, energy flows from the wheels to operate the electric machine as a generator that converts the energy into electricity. The electricity is often used to charge an energy storage device, such as a battery. Whether hydraulic or regenerative brakes are applied is determined by an electronic brake controller.

The ability to operate a motor vehicle is typically controlled by a key-operated switch, sometimes referred to as an ignition switch. Such switches may assume various forms, but perhaps the most common in present motor vehicles is a mechanical switch that is turned by a metal key. When a proper key is used, the switch may operated from an OFF position to additional positions, such as START, RUN (i.e. ON), and ACCESSORY, to deliver electric power to electric circuits and devices that perform certain functions related to vehicle starting and operation.

Certain electric circuits need to be energized for a brake-by-wire system to properly operate. Placing the energization of such circuits under the control of the ignition switch is desirable so that they do not needlessly, drain the battery when the ignition switch is OFF. However, turning the ignition switch off to de-energize those circuits may remove power from devices that when powered, aid in reducing the pedal effort required to apply the brakes via the master cylinder. Hence, brake pedal effort may increase significantly when the ignition switch is turned off.

Governmental regulation applicable to certain motor vehicles proposes to mandate certain consistency in brake pedal effort that is independent of whether the ignition switch is OFF or ON. In the case of a brake system that comprises only boosted hydraulic brakes, a vacuum reservoir is used to provide a vacuum reserve that allows the booster to aid the pedal effort for several brake applications after the ignition switch is turned off to stop the engine. In the case of certain brake-by-wire systems, the de-energization of associated electric circuits that occurs when the ignition switch is turned off, precludes continuance of the ability to aid the pedal effort that was present when the ignition switch was on.

A preliminary novelty search developed the following U.S. Pat. Nos.: 5,139,121; 5,752,748; 5,769,509; 5,800,025; 5,834,854; and 5,923,096.

SUMMARY OF THE INVENTION

The present invention relates to a strategy that is believe suitable for accomplishing the intent of the aforementioned regulatory proposal in a brake-by-wire system.

One general aspect of the invention relates to a motor vehicle comprising an electric powered brake system for braking road-engaging wheels of the motor vehicle. The vehicle has an ignition switch for turning the motor on and off, including controlling the application of electric power to the electric powered brake system. A control maintains application of full electric power to the electric powered brake system when the ignition switch is operated from ON to OFF so long as at least one parameter related to a respective component of the vehicle and indicative of a need to maintain full electric power application to the brake system continues to exist. The control discontinues application of full electric power to the brake system when all of selected ones of several such parameters are indicative of lack of need to maintain full electric power application to the brake system.

Another general aspect of the invention relates to a method for use in a motor vehicle that has an electric powered brake system for braking road-engaging wheels of the vehicle. The vehicle has an ignition switch for turning the motor on and off, including controlling the application of electric power to the electric powered brake system. A control controls the application of electric power to the brake system and functions to maintain application of full electric power to the electric powered brake system when the ignition switch is operated from ON to OFF so long as at least one parameter related to a respective component of the vehicle and indicative of a need to maintain full electric power application to the brake system continues to exist. The control also discontinues application of full electric power to the brake system when all of selected ones of several such parameters are indicative of lack of need to maintain full electric power application to the brake system.

Further aspects will be seen in various features of two presently preferred embodiments of the invention that will be described in detail.

BRIEF DESCRIPTION OF THE DRAWINGS

The drawings that will now be briefly described are incorporated herein to illustrate a preferred embodiment of the invention and a best mode presently contemplated for carrying out the invention.

DESCRIPTION OF THE PREFERRED EMBODIMENT(S)

Figure 1:
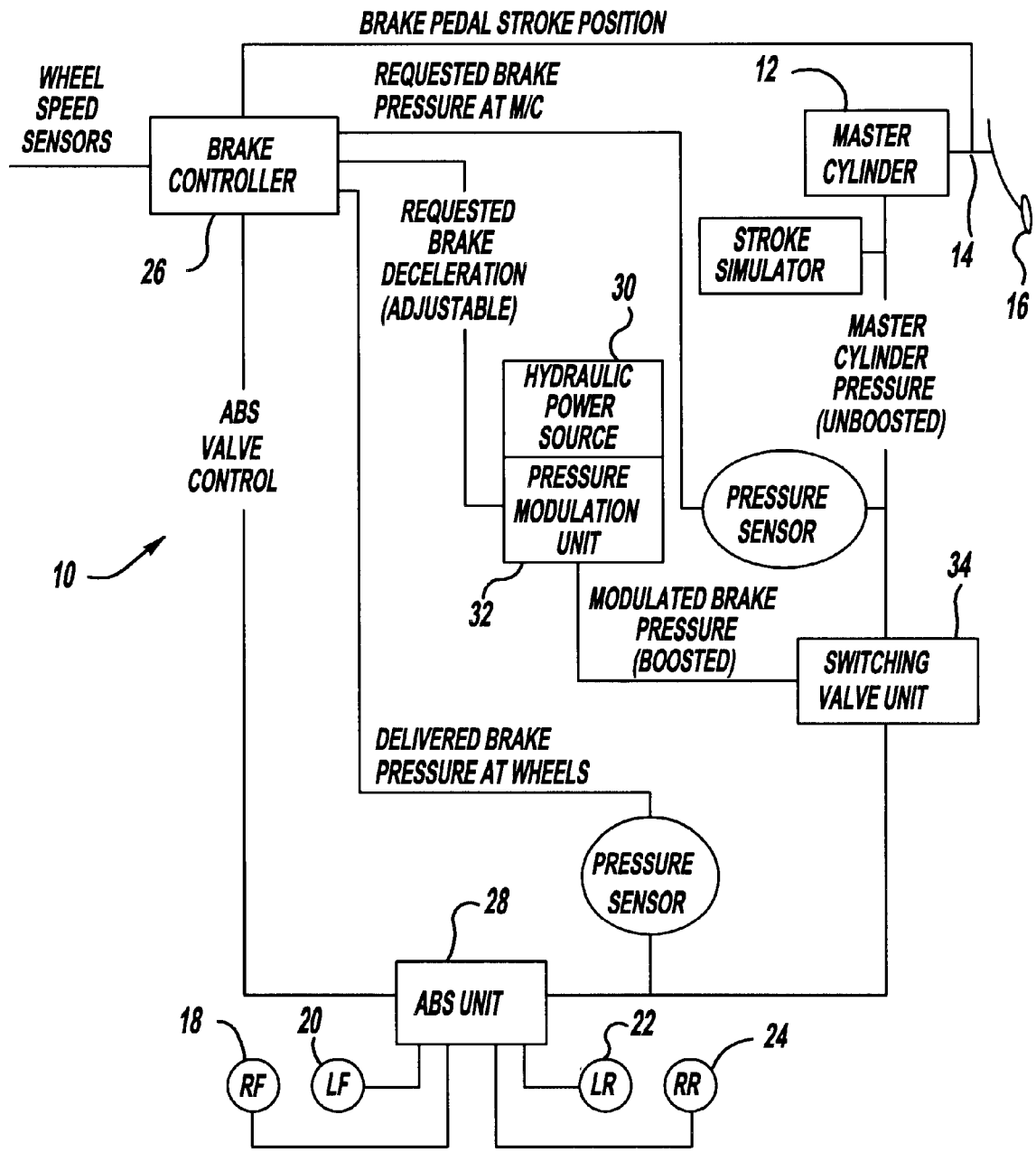
FIG. 1 is a general schematic diagram of a representative brake-by-wire system.

FIG. 1 shows a representative brake-by-wire system comprising a hydraulic brake master cylinder 12 having a plunger 14 which is adapted to be depressed by operation of a brake pedal 16 to brake road-engaging wheels of a motor vehicle. Braking may be accomplished either by hydraulic brakes at individual wheels, such as 18, 20, 22, 24, or by regenerative braking, as determined by an electronic brake controller 26. Hydraulic braking is applied through an ABS unit 28. Boost for aiding hydraulic braking so as to reduce pedal effort that would otherwise be required is derived from a hydraulic power source 30 whose pressure is modulated by a pressure modulation unit 32 under the control of brake controller 26. For developing the proper modulation, controller 26 senses brake pedal input with the use of one or more of the following: stroke position sensor; master cylinder pressure sensor; or any other sensor that may be used to indicate pedal input.

FIG. 1 includes a back-up hydraulic circuit path from master cylinder 12 to ABS unit 28 through a switching valve unit 34 that allows hydraulic brakes to alternatively be applied directly by hydraulic pressure from master cylinder 12. The regenerative braking system does not expressly appear in FIG. 1.

The delivery of electric power for operating brake-by-wire system 10 is controlled by the vehicle ignition switch, not specifically shown in FIG. 1. When that switch is OFF, power is not delivered; when the switch is ON, power is delivered. When the power is off, hydraulic power source 30 is unable to deliver the brake boost that it does when the power is on. Hence, when the ignition switch is turned from ON to OFF to shut down the vehicle powertrain (engine and/or motor), brake boost is also lost.

The present invention provides continued power to system 10, and hence continued brake boost, after the ignition switch is turned off, based on the non-occurrence of one or more particular events involving the vehicle. When all such events have occurred, power is removed from system 10 to avoid battery drain. The events are monitored by monitoring certain parameters related to positions and/or conditions of certain components of the vehicle.

Figure 2:
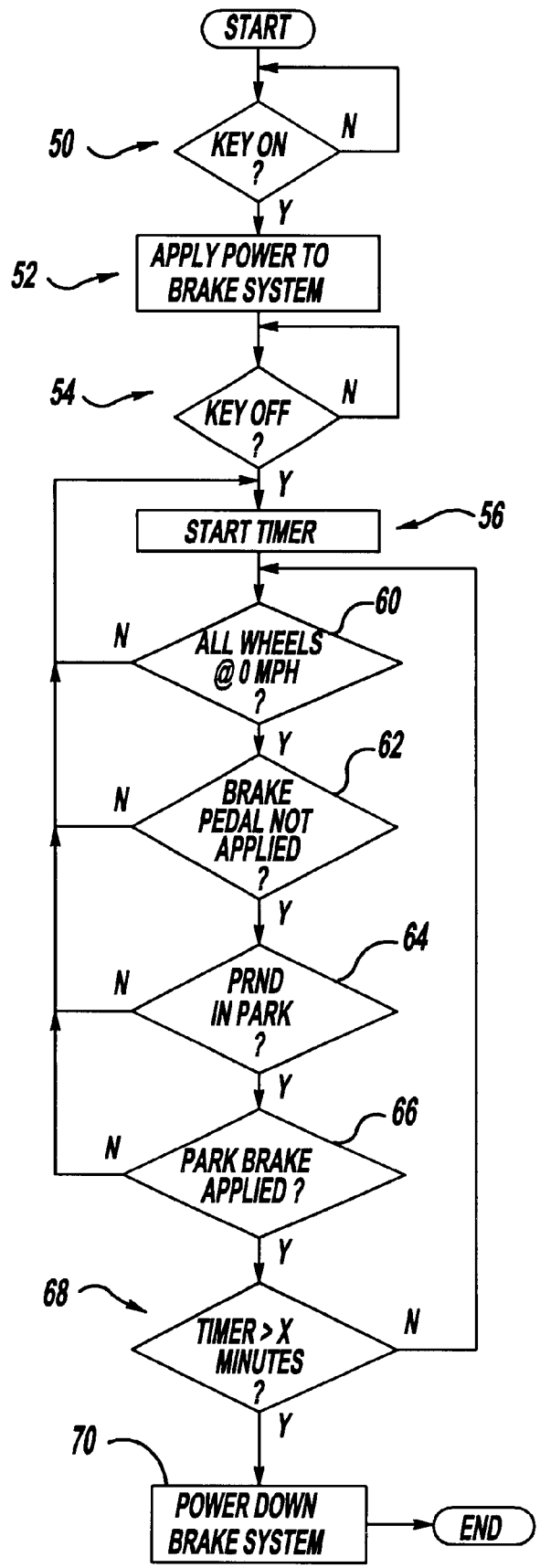
FIG. 2 is a flow diagram representing a first embodiment of strategy in accordance with principles of the present invention.

FIG. 2 shows an exemplary strategy that implements the inventive principles in a processor of the vehicle. The strategy involves monitoring for the ignition switch to be operated to ON (step 50). When the ignition switch is ON electric power is applied to system 10 (step 52).

Thereafter the strategy monitors for the ignition switch to be operated to OFF (step 54). When the ignition switch is OFF, a timer starts (step 56).

Power continues to be applied to system 10 based on the non-occurrence of the following events: all vehicle wheels not turning; brake pedal not applied; vehicle transmission not in PARK position; parking brake applied. Hence step 60 monitors for all wheels not turning; step 62, for pedal 16 not being applied; step 64, for transmission in PARK; and step 66 for parking brake applied. It can be seen that only after all these events have occurred is the elapsed time on the timer checked (step 68). If the elapsed time does not exceed a defined minimum (X minutes, for example), steps 60, 62, 64, and 66 continue to be executed.

When the events monitored by steps 60, 62, 64, and 66 have all occurred, and the elapsed time exceeds the defined minimum, power is removed from system 10. That concludes the strategy. The monitored events are considered to be indicative that there is no need for the service brakes to be applied, and hence that it is appropriate to de-energize system 10. Individual wheel speeds may determined by respective wheel speed sensors; non-application of brake pedal 12, from an associated sensor or switch; transmission in PARK from an associated transmission, or gear selector, switch; and parking brake applied from an associated sensor or switch. A representative defined time for X is 10 minutes.

Figure 3:
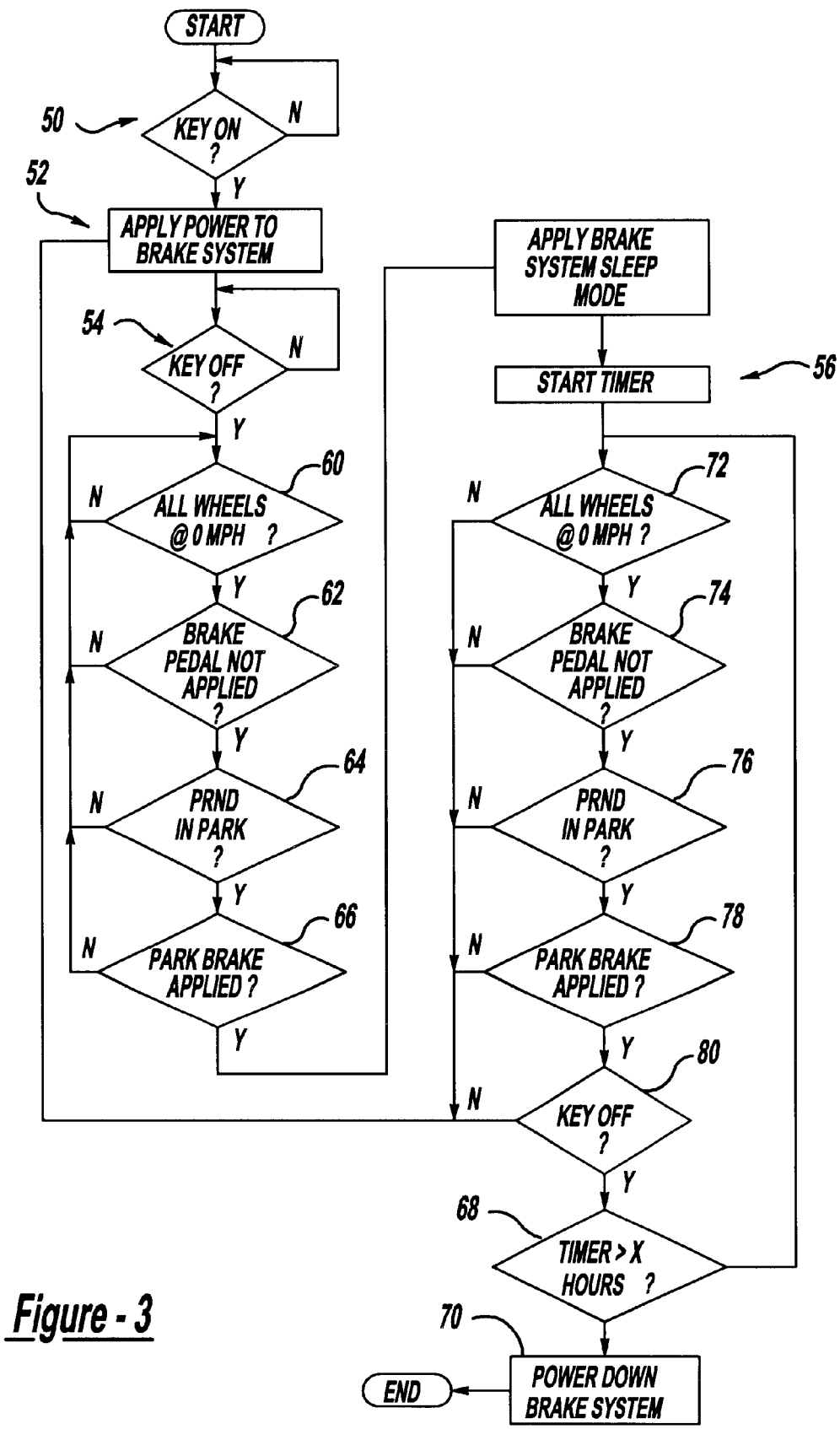
FIG. 3 is a flow diagram representing a second embodiment of strategy in accordance with principles of the present invention.

FIG. 3 shows a second embodiment of strategy that utilizes the steps of the first embodiment, but further includes a series of steps that provide for a reduced power sleep mode before power is completely removed from system 10. The timing step 56 does not commence until after the events monitored by steps 60, 62, 64, and 66 have all occurred. Power, but at a reduced level, continues to be applied to system 10 after the monitored events have all occurred and the sleep mode commences. The monitored events, and the state of the ignition switch, continue to be monitored during the sleep mode (steps 72, 74, 76, 78, 80), and if there is a change in any one of those events or the ignition switch before the defined time X has elapsed, full power is promptly re-applied to system 10, and the strategy starts anew at step 54. It is only after there is no change in any monitored event (steps 72, 74, 76, 78) or in the ignition switch (step 80) after an elapsed time X, measured in hours rather than minutes, 10 hours for example, that power is completely disconnected from system 10. The sleep mode may provide for more quickly powering up system 10.

From the foregoing, one can understand that the present invention conditions the termination of brake boost at key off. It is believed that the present invention can enhance the effectiveness and acceptability of electrically-powered brake-by-wire systems.

While a presently preferred embodiment has been illustrated and described, it is to be appreciated that the invention may be practiced in various forms within the scope of the following claims. Examples of such additional forms include the non-use of certain events, or parameters, already specifically mentioned above and/or the use of certain events, or parameters, not previously mentioned above, including occupant restraint engagement (i.e. seat belt engagement), driver position, steering input, accelerator pedal input, and clutch input. Furthermore, monitoring of various events, or parameters, may occur serially, as described above, or in parallel, or in various serial and parallel combinations.

What is claimed is:

1. A motor vehicle comprising:
   an electric powered brake system for braking road-engaging wheels of the motor vehicle;
   an ignition switch for turning a motor of the motor vehicle on and off, including controlling the application of electric power to the electric powered brake system;
   and a control for maintaining application of full electric power to the electric powered brake system when the ignition switch is operated from ON to OFF so long as at least one parameter related to a respective component of the vehicle and indicative of a need to maintain full electric power application to the brake system continues to exist and for discontinuing application of full electric power to the brake system when all of selected ones of several such parameters are indicative of lack of need to maintain full electric power application to the brake system; wherein
   the control is effective to reduce the amount of electric power to the brake system when all of the selected ones of several such parameters are indicative of lack of need to maintain full electric power application to the brake system, and at a later time, to discontinue the application of all electric power to the brake system; and
   the control is effective at the later time, to discontinue the application of all electric power to the brake system provided that all of the selected ones of several such parameters have continued until the later time to be indicative of lack of need to maintain full electric power application to the brake system.

2. A motor vehicle as set forth in claim 1 in which the control is effective to restore the application of full electric power to the brake system if any of the selected ones of several such parameters ceases to be indicative of lack of need to maintain full electric power application to the brake system prior to the later time.

3. A motor vehicle as set forth in claim 1 in which the parameters include at least two of: vehicle wheel speed, position of a brake pedal for operating the brake system, gear position of a transmission of the vehicle, and position of a parking brake of the vehicle.

4. A motor vehicle comprising:
an electric powered brake system for braking road-engaging wheels of the motor vehicle;
an ignition switch for turning a motor of the motor vehicle on and off, including controlling the application of electric power to the electric powered brake system;
and a control for maintaining application of full electric power to the electric powered brake system when the ignition switch is operated from ON to OFF so long as at least one parameter related to a respective component of the vehicle and indicative of a need to maintain full electric power application to the brake system continues to exist and for discontinuing application of full electric power to the brake system when all of selected ones of several such parameters are indicative of lack of need to maintain full electric power application to the brake system; wherein
the parameters include all of: vehicle wheel speed, position of a brake pedal for operating the brake system, gear position of a transmission of the vehicle, and position of a parking brake of the vehicle.

5. A motor vehicle as set forth in claim 4 in which the control further executes a timing function that must be satisfied before application of full electric power to the brake system is allowed to be discontinued.

6. A motor vehicle as set forth in claim 5 in which the timing function commences upon the ignition switch being operated from ON to OFF.

7. A motor vehicle as set forth in claim 5 in which the timing function commences after the ignition switch has been operated from ON to OFF and after all of the selected ones of several such parameters have become indicative of lack of need to maintain full electric power application to the brake system.

8. In a motor vehicle comprising an electric powered brake system for braking road-engaging wheels of the motor vehicle, an ignition switch for turning a motor of the motor vehicle on and off, including controlling the application of electric power to the electric powered brake system, and a control for controlling the application of electric power to the brake system, the method which comprises:
maintaining application of full electric power to the electric powered brake system when the ignition switch is operated from ON to OFF so long as at least one parameter related to a respective component of the vehicle and indicative of a need to maintain full electric power application to the brake system continues to exist; and
discontinuing application of full electric power to the brake system when all of selected ones of several such parameters are indicative of lack of need to maintain full electric power application to the brake system, including reducing the amount of electric power to the brake system when all of the selected ones of several such parameters are indicative of lack of need to maintain full electric power application to the brake system, and at a later time, discontinuing the application of all electric power to the brake system, and
at the later time, discontinuing the application of all electric power to the brake system provided that all of the selected ones of several such parameters have continued until the later time to be indicative of lack of need to maintain full electric power application to the brake system.

9. A method as set forth in claim 8 including restoring the application of full electric power to the brake system if any of the selected ones of several such parameters ceases to be indicative of lack of need to maintain full electric power application to the brake system prior to the later time.

10. A method as set forth in claim 8 including monitoring, as the parameters, at least two of:
vehicle wheel speed, position of a brake pedal for operating the brake system, gear position of a transmission of the vehicle, and position of a parking brake of the vehicle.

11. In a motor vehicle comprising an electric powered brake system for braking road-engaging wheels of the motor vehicle, an ignition switch for turning a motor of the motor vehicle on and off, including controlling the application of electric power to the electric powered brake system, and a control for controlling the application of electric power to the brake system, the method which comprises:
maintaining application of full electric power to the electric powered brake system when the ignition switch is operated from ON to OFF so long as at least one parameter related to a respective component of the vehicle and indicative of a need to maintain full electric power application to the brake system continues to exist; and
discontinuing application of full electric power to the brake system when all of selected ones of several such parameters are indicative of lack of need to maintain full electric power application to the brake system,
including monitoring, as the parameters, all of:
vehicle wheel speed, position of a brake pedal for operating the brake system, gear position of a transmission of the vehicle, and position of a parking brake of the vehicle.

12. A method as set forth in claim 11 includes executing a timing function that must be satisfied before application of full electric power to the brake system is allowed to be discontinued.

13. A method as set forth in claim 12 including commencing the timing function upon the ignition switch being operated from ON to OFF.

14. A method as set forth in claim 12 including commencing the timing function after the ignition switch has been operated from ON to OFF and after all of the selected ones of several such parameters have become indicative of lack of need to maintain full electric power application to, the brake system.

* * * * *